(12) United States Patent
Saito et al.

(10) Patent No.: US 7,295,768 B2
(45) Date of Patent: *Nov. 13, 2007

(54) RECORDING AND REPRODUCING APPARATUS

(75) Inventors: Shuji Saito, Chiba (JP); Eiichi Takakura, Nagareyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1113 days.

This patent is subject to a terminal disclaimer.

(21) Appl. No.: 10/276,255

(22) PCT Filed: Mar. 27, 2001

(86) PCT No.: PCT/JP01/02489

§ 371 (c)(1),
(2), (4) Date: Nov. 15, 2002

(87) PCT Pub. No.: WO01/95622

PCT Pub. Date: Dec. 13, 2001

(65) Prior Publication Data

US 2003/0123842 A1    Jul. 3, 2003

(30) Foreign Application Priority Data

Jun. 9, 2000  (JP) .............................. 2000-174303

(51) Int. Cl.
*H04N 5/91* (2006.01)
*H04N 5/92* (2006.01)
*H04N 7/26* (2006.01)

(52) U.S. Cl. .................... 386/131; 386/68; 386/124

(58) Field of Classification Search .................... 386/1, 386/4, 5, 46, 66, 124, 52, 68, 131; 348/384.1, 348/441, 469, 500; 369/59, 60
See application file for complete search history.

(56) References Cited

U.S. PATENT DOCUMENTS

| 5,434,676 | A |  | 7/1995 | Okamoto et al. |
| 5,479,265 | A | * | 12/1995 | Kim et al. ................... 386/124 |
| 5,579,060 | A |  | 11/1996 | Elberbaum |
| 5,694,383 | A | * | 12/1997 | Arataki et al. ........... 369/47.32 |
| 5,724,476 | A |  | 3/1998 | Suzuki |

(Continued)

FOREIGN PATENT DOCUMENTS

GB        2 281 835 A       3/1995

(Continued)

OTHER PUBLICATIONS

European Search Report mailed Jul. 12, 2004 in corresponding EP application No. 01915847.6-1522/JP0102489.

(Continued)

*Primary Examiner*—Thai Q. Tran
*Assistant Examiner*—Michael P Choi
(74) *Attorney, Agent, or Firm*—Nixon & Vanderhye P.C.

(57) ABSTRACT

In a recording and reproducing apparatus for recording and reproducing video data, includes: a shuffling memory (6); a writing means for writing video data into the shuffling memory in accordance with the synchronizing signal and a write reference clock signal in synchronization with the video data; and a reading means for reading out the video data from the shuffling memory in accordance with a synchronizing signal and a stabilized read reference clock which is asynchronous with the write clock signal.

10 Claims, 8 Drawing Sheets

U.S. PATENT DOCUMENTS

| | | | |
|---|---|---|---|
| 5,767,863 A | | 6/1998 | Kimura |
| 5,914,711 A | | 6/1999 | Mangerson et al. |
| 5,933,155 A | | 8/1999 | Akeley |
| 6,021,249 A | * | 2/2000 | Kitamura ..................... 386/33 |
| 6,108,487 A | * | 8/2000 | Takeda ....................... 386/124 |
| 6,178,289 B1 | * | 1/2001 | Jang ........................... 386/112 |
| 6,393,197 B2 | * | 5/2002 | Henmi et al. ................. 386/52 |
| 6,571,054 B1 | * | 5/2003 | Tonomura et al. ............ 386/95 |
| 7,127,157 B1 | * | 10/2006 | Saito et al. ................. 386/124 |

FOREIGN PATENT DOCUMENTS

| | | |
|---|---|---|
| JP | 04-86381 | 7/1992 |
| JP | 05-036219 | 2/1993 |
| JP | 09-037208 | 2/1997 |
| JP | 2001-016544 | 1/2001 |
| WO | WO 97/23092 | 6/1997 |

OTHER PUBLICATIONS

Supplementary European Search Report mailed Sep. 3, 2004 in corresponding EP application No. 01915847.6-1522/JP0102489.

* cited by examiner (a)

(b)

RECORDING AND REPRODUCING APPARATUS

This application is the US national phase of international application PCT/JP01/02489 filed 27 Mar. 2001, which designated the US.

TECHNICAL FIELD

The present invention relates to a recording and reproducing apparatus, and in particular relates to a recording and reproducing apparatus for recording and reproducing a digital video signal.

BACKGROUND ART

With recent development of digital signal processing technologies, apparatus for recording and reproducing high-efficiency coded digital data of video signals etc., for example, digital video cassette tape-recorders (referred to hereinafter as DVC), have become generalized.

The present applicant hereof has previously proposed a method of recording and reproducing external input video signals such as composite signals, etc., in a recording and reproducing apparatus.

FIG. 8 shows the embodiment of the previously proposed recording and reproducing apparatus.

In this figure, 1 designates an I/O block(input/output processor), 2 a VSP (Video Signal Processing) block (compressing and expanding processor), 3 a DRP (Data Recording Playback) block (recording and reproducing processor), 4 a control block, 5 an input video signal processing circuit, 6 a shuffling memory, 7 an orthogonal transformation (data compression coding) circuit, 8 a framing circuit, 9 a PTG memory, 10 an encoder, 11 a decoder, 12 an ECC memory, 13 a deframing circuit, 14 an inverse orthogonal transformation (data expansion decoding) circuit, 15 an output video signal processing circuit, 16 a synchronization separator circuit, 17 a vertical and horizontal synchronization separator circuit, 18 an I/O PLL circuit, 19 a multiplexer, 20 an I/O control signal generator circuit, 21 a 13.5 MHz clock generator circuit, 22 4/1 PLL circuit, 23 a frequency divider, 24 a frame pulse generation counter, 25 a VSP control signal generator circuit, 26 a DRPPLL circuit, 27 a DRP control signal generator circuit, 28 an external input control circuit, 29 a phase comparator and 30 a data masking circuit.

This recording and reproducing apparatus is overall configured of I/O block 1 as an input/output portion for handling input and output of video signals, VSP block 2 for effecting predetermined processes on video data, a DRP block 3 for performing recording and reproducing processes for recording and reproducing video data and control block 4 for generating clock signals required for blocks 1 to 3 and controlling the whole apparatus.

Conventionally, during the playback mode in the recording and reproducing apparatus, the frequency of the frame pulse may fluctuate due to some causes. To deal with cases, a high-precision oscillator such as a crystal oscillator and the like has been used to provide a stable internal clock. That is, a stable reproduction is realized by using the frame pulses of a stable frequency generated based on the counts of the internal clock. However, for reception in the data communication using a digital interface conforming to the IEEE1394 standards (referred to hereinafter as 1394I/F), which has become prevalent recently, the data synchronously transmitted with the frame pulse from the transmitter side should be processed, so that the frame pulse inside the recording and reproducing apparatus as the receiver side needs to be locked with the frame pulse of the transmitter side. In this case, however, the frequency of the internal frame pulse is expected to fluctuate due to the phase difference between the frame pulse on the transmitter side immediately after the start of reception and the internal frame pulse or due to jitter of the frame pulse occurring when the source on the transmitter side is analog and a special playback is performed. Since a PLL circuit is used so as to always keep the number of clock pulses within one frame constant, if the frequency of the frame pulse fluctuates, jitter will occur in the pulse width of the system clock, which in turn will cause fluctuations in the monitor output picture or other turbulence. No particular consideration with regard to this point was given by the previously proposed recording and reproducing apparatus.

Further, other than there reasons, there is a possibility that the frame length of the frame pulse may vary due to noises etc., and due to synchronization fluctuations in the circuits. If the number of clock pulses in one frame fluctuates, the synchronism with the video data loses, causing disturbance in the output video data. The previously proposed recording and reproducing apparatus is not the one which gives a particular consideration to this problem.

The object of the present invention is to provide a recording and reproducing apparatus which, even when the synchronism of the frame pulse becomes turbulent, can output normal video data and always keeps the output video data in synchronism and the clock frequency stable.

DISCLOSURE OF INVENTION

In order to solve the above problems, the present invention adopts the following means:—

The first means resides in a recording and reproducing apparatus for recording and reproducing video data, comprising: a memory; a writing means for writing video data into the memory in accordance with the synchronizing signal and a write reference clock signal in synchronization with the video data; and a reading means for reading out the video data from the memory in accordance with a synchronizing signal and a stabilized read reference clock asynchronous with the write clock, wherein the memory at least has a capacity of three frames of video data and is provided with a page management means for managing the frame pages of the memory, and the reading means reads the video data, which has been written in accordance with the page management means by the writing means, in accordance with the instructions for double reading of the same frame and frame dropping from the page management means.

The second means is characterized in that, in the first means, the page management means includes: a detecting means for detecting whether the frame length of the frame pulse of video data falls within the designated range; and a retaining means for performing control so that the writing to the memory and the readout page are retained when the detecting means detects the fact that the frame length falls out of the predetermined range.

The third or the fourth means is characterized in that, in the first or the second means respectively, the memory are used in common for recording and reproduction. The fifth or the sixth means is characterized in that, in the first or the second means, respectively, further comprising a means for recording a compressed stream received by way of an interface (I/F) as being recording by a clock signal obtained base on the reference clock signal in synchronism with the received data.

The seventh or the eighth means is characterized in that, in the first or the second means, respectively at least one of the readout reference clock signal and the synchronizing signal used by the reading means is supplied from the outside of the recording and reproducing apparatus.

The ninth or the tenth means is a video editing system including a multiple number of recording and reproducing apparatus defined as the above first or the second means, respectively, and a video editing unit for editing the video data read out from the memories of the multiple recording and reproducing apparatus, and is characterized in that the same reference clock signal and synchronizing signal are used in common on the side of reading video data from the memories so as to synchronize the output video picture from each recording and reproducing apparatus with that from the others.

BEST MODE FOR CARRYING OUT THE INVENTION

To begin with, the first embodiment of the present invention will be described with reference to FIGS. 1 through 6.

Figure 1:
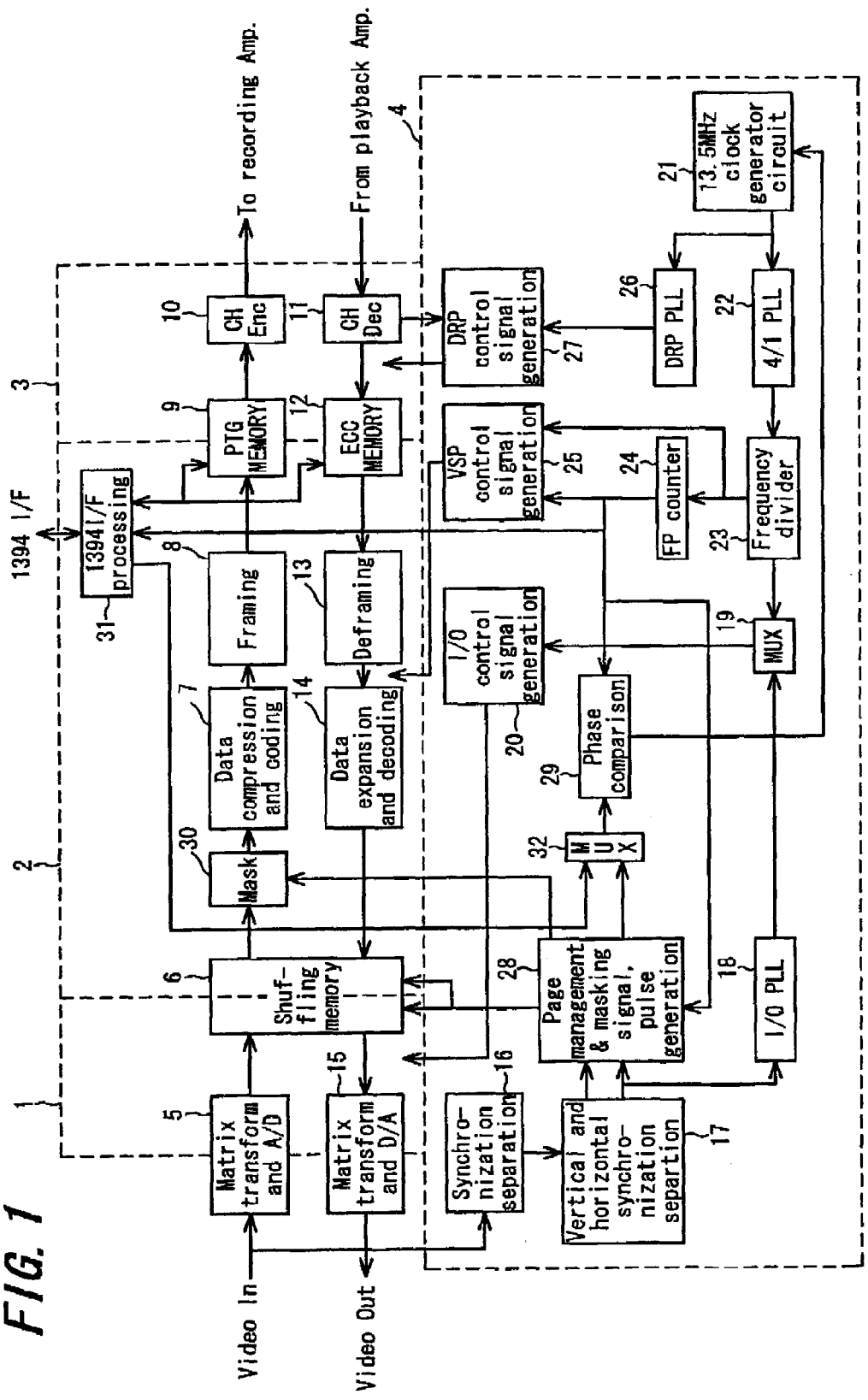
FIG. 1 is a block diagram showing the configuration of a recording and reproducing apparatus in accordance with the first embodiment of the present invention.
Figure 8:
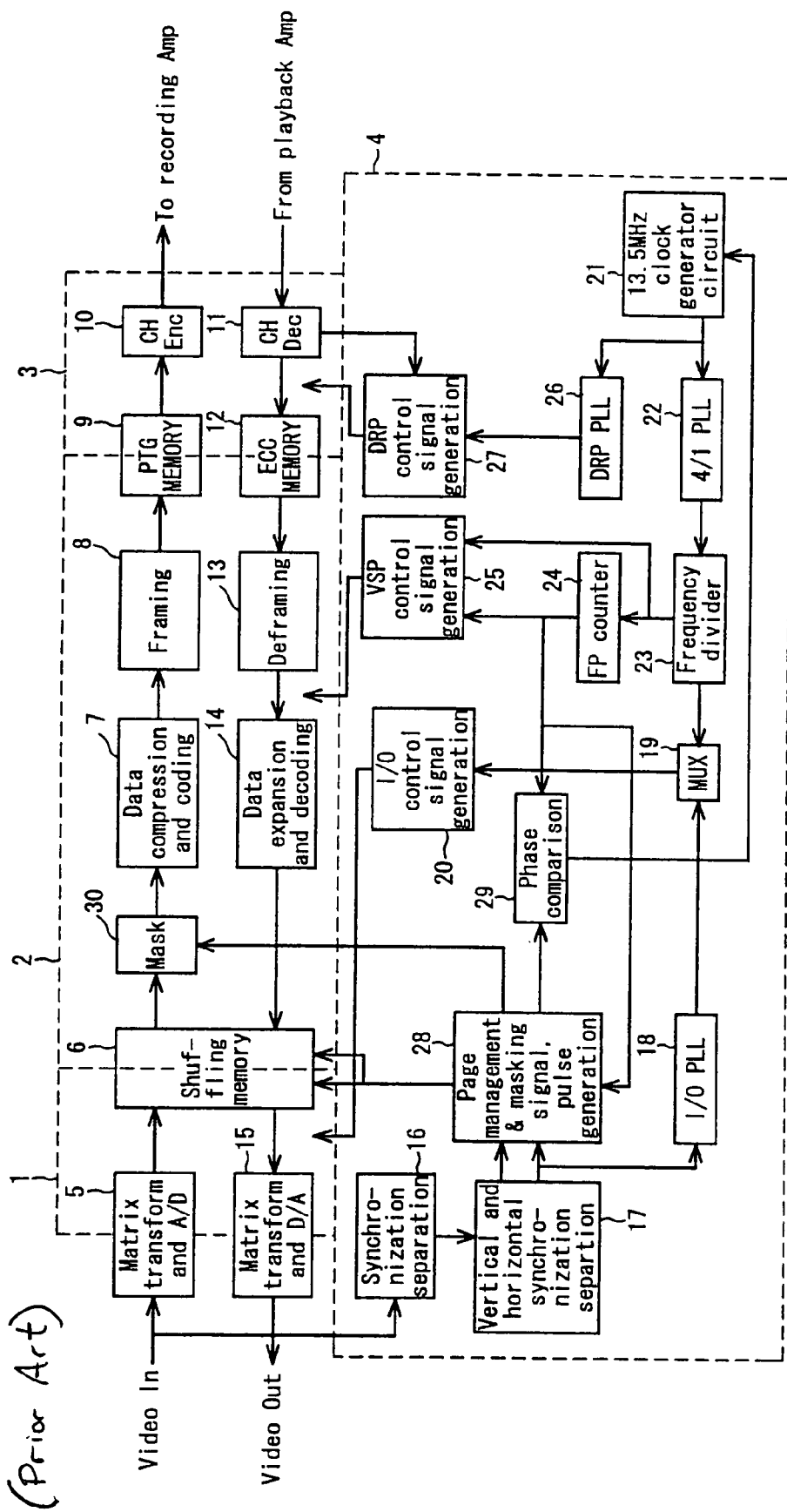
FIG. 8 is a block diagram showing the configuration of a recording and reproducing apparatus according to the prior art.

FIG. 1 is a block diagram showing the configuration of a recording and reproducing apparatus in accordance with the present embodiment. In this figure, 31 designates a 1394I/F processing circuit and 32 designates a multiplexer. Other configurations correspond to those allotted with the same reference numerals as in FIG. 8 so that description is omitted.

In the present invention, in order to solve the above problems, writing of video data to and reading of it from shuffling memory 6 are asynchronous to each other. In this case, there occurs the problem that the data of one frame will mix with that of an adjacent frame, so that the method of solving this problem will be first explained.

First, explanation will be made on shuffling of video data. Generally, an orthogonal transformation is performed in order to compress and record video data. To achieve this, in order to reduce variations in the amount of information and improve the compression efficiency, shuffling (rearrangement of video data) is performed. On the contrary, when video data is reproduced, after expansion and inverse orthogonal transformation, deshuffling (rearrangement of video data in the original order) is performed. These shuffling and deshuffling are as a whole referred to hereinbelow as shuffling process.

In order to simply effect the aforementioned shuffling process, a method (bank method) is used wherein, with two memories each capable of storing one frame of video data provided, data is written into one of them while the previous frame data is being read from the other in the order different from that when the data was written in. However, conventionally the memory were high in price and the memory for two frames needed for the above bank method was too large in capacity and this method presented poor cost performance. To solve this problem, a shuffling process using a memory for one frame was used.

Next, with reference to FIG. 2 description will be made on the method of a shuffling process using a memory for one frame.

Figure 2:
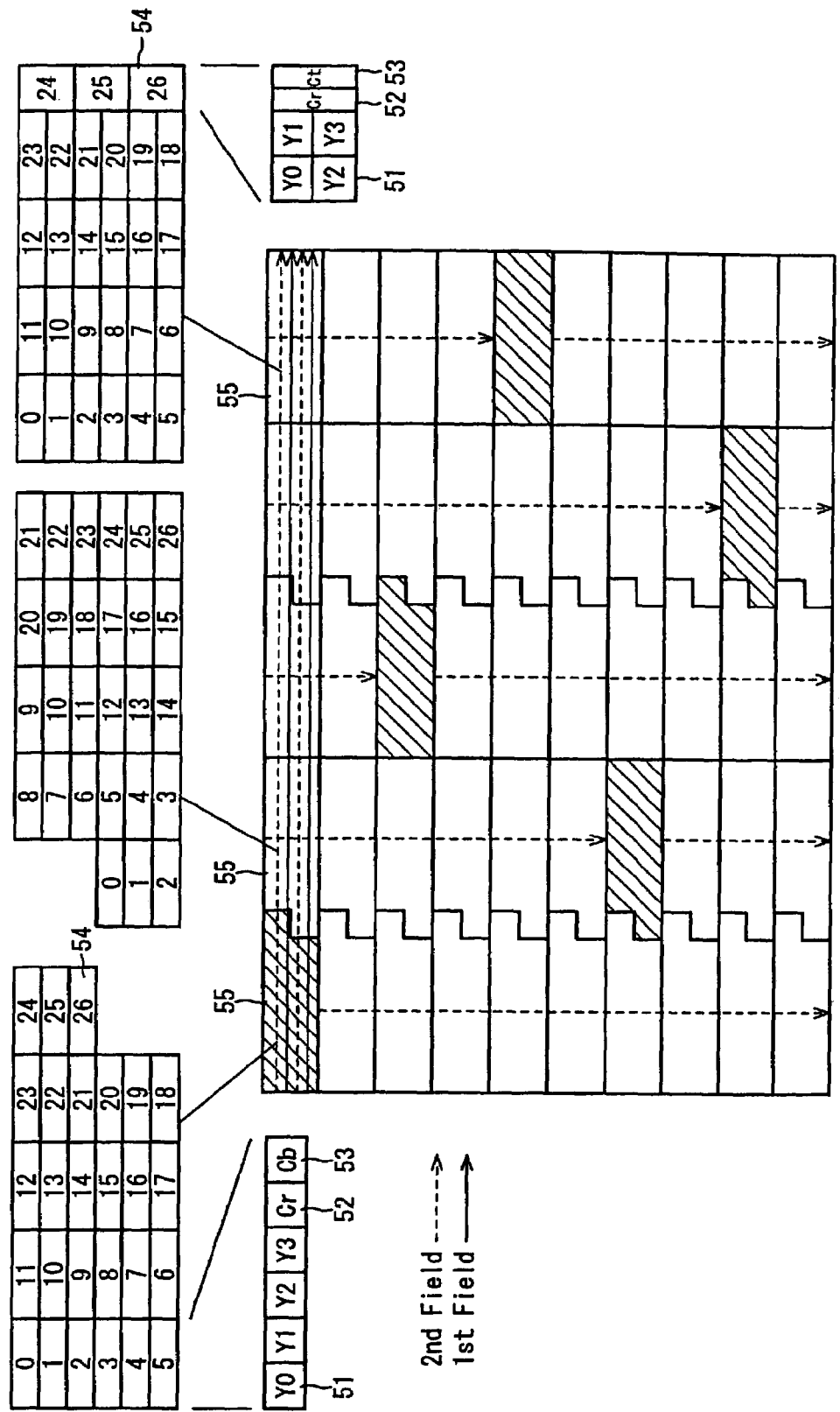
FIG. 2 is a diagram showing a memory configuration for one frame in the standard mode 525/60 system.

FIG. 2 is a diagram showing a memory configuration for one frame in the standard mode 525/60 system. In this figure, 51 designates a Y-signal DCT block, 52 a Cr-signal DCT block, 53 a Cb-signal DCT block, 54 a macro block, 55 a super block.

First, writing to the memory is performed by the smallest units, called DCT blocks, each made up of eight samplings in the horizontal direction and eight samplings in the vertical direction. Six DCT blocks, i.e., four Y-signal DCT block 51, one Cr-signal DCT block 52 and one Cb-signal DCT block 53 are grouped together to form one macro block 54. Further, twenty-seven macro blocks 54 are grouped into one super block 55. Written first is the super block 55 with hatching in the drawing. That is, Y-signal DCT blocks 51, namely Y0 to Y3, Cr-signal DCT block 52 and Cb-signal DCT block 53 are written in order mentioned in units of macro block 54. When five super blocks 55 each having 0 to 26 macro blocks 54 have been written, the position of writing moves down to the super block 55 in the next row and starts therefrom.

Next, retrieval is performed by reading the data in the first field, 240 alternate, horizontal lines and then reading the data in the second field, similarly 240 alternate, horizontal lines. The data of the next frame is written into the super block 55 from which the current data has been read out. Thus, the data is successively written into the blocks from which the current data has been read out, to thereby realize the shuffling process with a memory for one frame.

Next, the phenomenon of mixture of one frame of data with an adjacent frame of data in the shuffling processing using a memory for one frame will be described.

When the period of reading is shorter than that of writing, writing gradually fails to keep up with the pace of reading so that data is read out from the super blocks 55 from which writing has yet to be done, thus data having the data from the previous frame mixed therein is read out. When the period of reading is longer than that of writing, reading gradually fails to keep up with the pace of writing so that data of the next frame is written into the super blocks 55 from which reading has yet to be done, thus data having the data for the next frame mixed therein is read out.

Thus, in the case where a shuffling process is performed using the memory for one frame, if the period of writing and that of reading differ from each other, data mixture of adjacent frames occurs. Further, since the rule of address rounding of writing/reading breaks down, there is a possibility that restoration cannot be obtained unless address rounding is reset, posing difficulties in using this method.

However, because of recent price reduction due to development of memories into large capacities and mass production, if an external memory is used, a multipurpose memory has become advantageous in cost over a dedicated memory for one frame. Use of a 16 Mbit DRAM makes it possible to provide memory space for three frames even if the standard mode 625/50 system, needing the largest amount of data for one frame (4.75 Mbits),is used. As a result, it becomes possible to use the aforementioned bank method. Next, a comparison will be made between a process of shuffling based on the bank scheme using memory for two frames and that using memory for three frames, when the period of writing and that of reading differ from each other.

Figure 3:
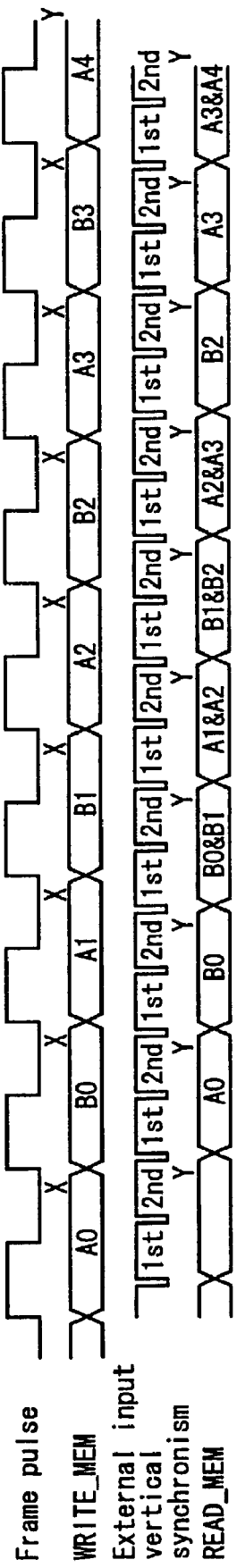
FIG. 3 is a diagram for explaining writing and reading processes when the period of reading is shorter than that of writing, in the case where a memory for two frames of video data and a memory for three frames of video data are used.
Figure 3:
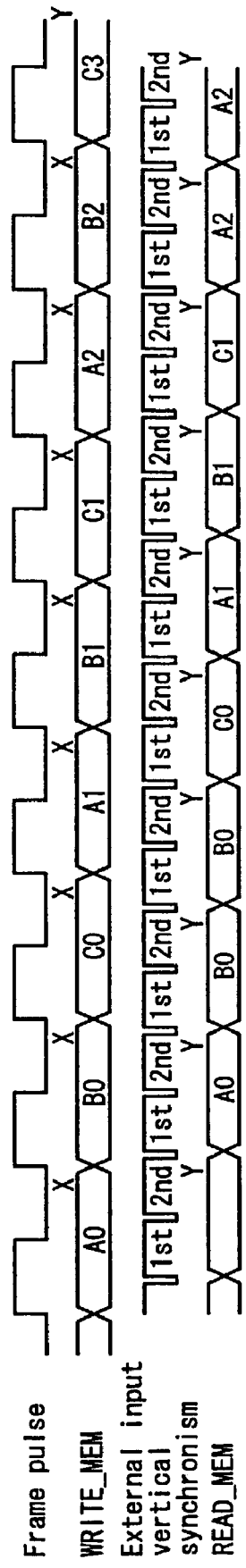

Referring first to FIG. 3, the case where the period of reading is shorter than that of writing will be described.

FIG. 3(*a*) shows the case using memory for two frames and FIG. 3(*b*) shows the case using memory for three frames. X in the drawings indicates the point (the ninth super block in the standard mode 525/60 system) at which a sufficient enough amount of data has been written in to start reading while shuffling and reading is performed for the data which has been written beyond the position X. Y in the drawings indicates the end point of reading and if writing starts before this point, the data will become mixed up. It is also assumed that the first frame of the memory is A, the second frame is B and the third frame is C.

In FIG. 3(*a*), since A1 would be read out earlier before the point X at which writing of A1 is finished, B0 is read twice. Since writing of B1 starts before the point Y at which reading of B0 is finished, the read out data is the mixture of B0 and B1. Then, since reading of A1 is performed but writing of A2 starts before the point Y at which reading A1 is finished, the read out data is the mixture of A1 and A2. Similarly, for reading of B1, the read out data is the mixture of B1 and B2, and for reading of A2, the read out data is the mixture of A2 and A3. Then, for reading of B2, normal reading free from data mixture can be restored since next writing of B3 does not start by the point Y at which reading of B is finished.

In FIG. 3(*b*), since C0 would be read out earlier before the point X at which writing of C0 is finished, B0 is read twice. Since writing of A1 starts after the end of writing of C0, the second reading of B0 is performed normally without any data mixture, and no mixture of data will occur thereafter.

Therefore, when shuffling is performed using the memory for two frames, mixed up data is read out from the frame during the period in which reading and writing overlap. Depending upon the phase difference between the period of reading and the period of writing, mixed data portions and normal data portions appear periodically. It should be noted that, in this case, a time lag equivalent to two frames exists within the data in the mixed data portion. When shuffling is performed using the memory for three frames, no data mixture will occur by reading appropriate data twice.

Figure 4:
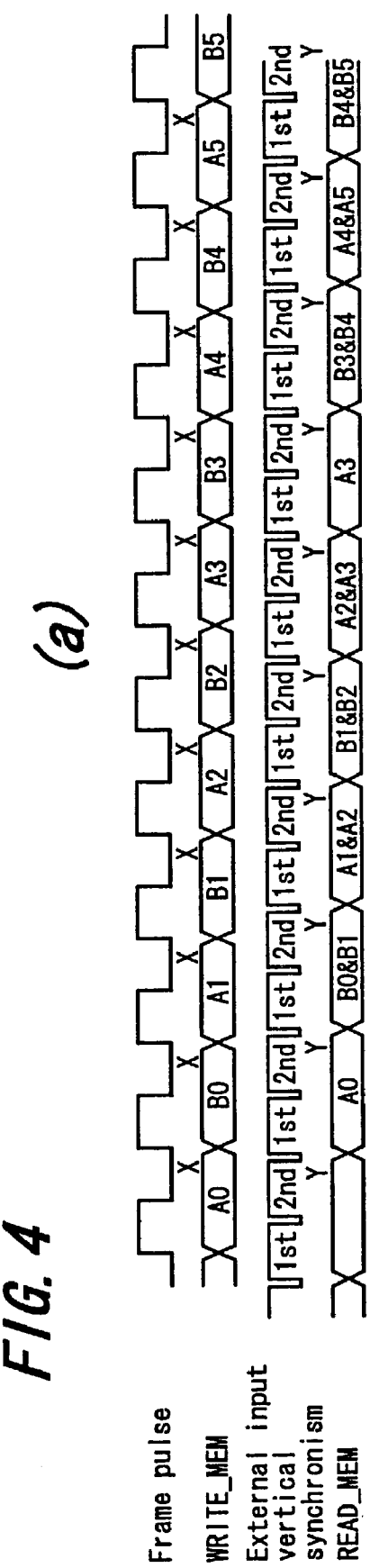
FIG. 4 is a diagram for explaining writing and reading processes when the period of reading is longer than that of writing, in the case where a memory for two frames of video data and a memory for three frames of video data are used.
Figure 4:
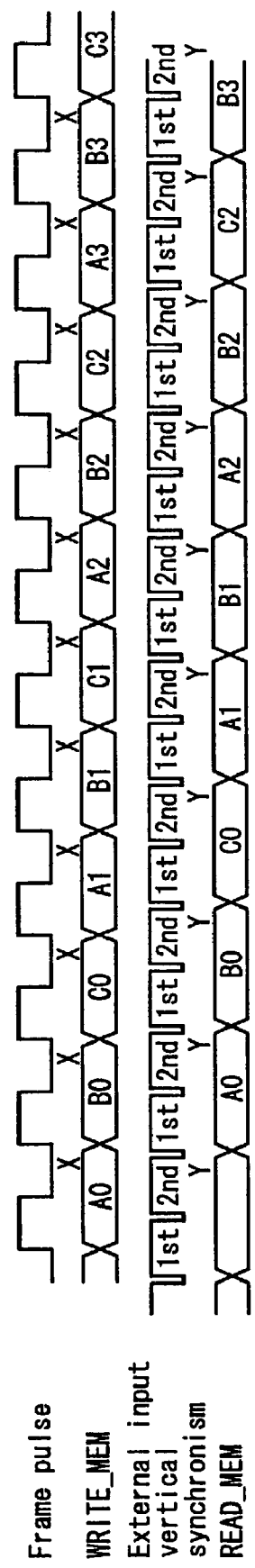

Referring first to FIG. 4, the case where the period of reading is longer than that of writing will be described.

FIG. 4(*a*) shows the case using memory for two frames and FIG. 4(*b*) shows the case using memory for three frames. X in the drawings indicates the point (the ninth super block in the standard mode 525/60 system) at which a sufficient enough amount of data has been written in to start reading while shuffling. Reading is performed for the data which has been written beyond the position X. Y in the drawings indicates the end point of reading and if writing starts before this point, the data will become mixed up. It is also assumed that the first frame of the memory is A, the second frame is B and the third frame is C.

In FIG. 4(*a*), since writing of B1 starts before the point Y at which reading of B0 is finished, the read out data is the mixture of B0 and B1. Then, since reading of A1 is performed but writing of A2 starts before the point Y, the read out data is the mixture of A1 and A2. Similarly, for reading of B1, the read out data is the mixture of B1 and B2, and for reading of A2, the read out data is the mixture of A2 and A3. For the next reading, since the start point of reading has passed by the point X at which writing of A3 is finished, A3 is read out without reading B2, whereby normal reading free from data mixture is restored.

In FIG. 4(*b*), after reading, of B1, A2 is read out without reading C1 since the start point of reading has passed the point X at which writing of A2 is finished, whereby data free from data mixture can be read out normally.

Therefore, when shuffling is performed using the memory for two frames, mixed up data is read out from the frame during the period in which reading and writing overlap. Depending upon the phase difference between the period of reading and the period of writing, mixed data portions and normal data portions appear periodically. It should be noted that, in this case, a time lag equivalent to two frames exists within the data in the mixed data portion. When shuffling is performed using the memory for three frames, no data mixture will occur by dropping appropriate data.

As described above, when writing to and reading from the shuffling memory are asynchronous, use of memory for three frames makes it possible to perform a shuffling process without any mixture of data.

Also in the aforementioned technology proposed by the present applicant, when an external input video signal such as a composite signal, etc., is recorded, writing the video data into the shuffling memory and reading it therefrom are asynchronous. Since this configuration also uses memory for three frames for the same reason as above, the memory for three frames can be used in common for recording and reproduction.

Next, recording and reproduction of the recording and reproducing apparatus of the present embodiment using shuffling memory 6 for three frames will be described with reference to FIG. 1.

First, the recording operation of a composite signal, for example, in this recording and reproducing apparatus will be described.

To begin with, in control block 4, a synchronizing signal is extracted at synchronization separator circuit 16 from the input composite signal and supplied to vertical and horizontal synchronization separator circuit 17. In vertical and horizontal synchronization separator circuit 17, the synchronizing signal is separated into the vertical synchronizing signal and horizontal synchronizing signal. I/OPLL circuit 18, using the horizontal synchronizing signal as a reference signal, forms the 13.5 MHz clock signal which is recommended by the International Telecommunication Union (ITU-R). This clock signal is supplied to I/O control signal generator circuit 20 via multiplexer 19. In I/O control signal generator circuit 20, an I/O control signal is formed and supplied along with the 13.5 MHz clock signal to I/O block 1.

The horizontal synchronizing signal is used in external output control circuit 28 as a reference for generation of a frame pulse as an external input synchronizing signal when the frame length of the video signal is standard. When the frame length of the video signal is of a non-standard frequency, an internal free-running synchronizing signal from a free-running counter is used as a reference to generate a frame pulse. The generated frame pulse is supplied to phase comparator 29 via multiplexer 32.

In 13.5 MHz clock generator circuit 21, a clock signal of 13.5 MHz is formed and supplied to 4/1PLL circuit 22 and DRPPLL circuit 26. In 4/1PLL circuit 22, the 13.5 MHz clock signal is multiplied by 4 so as to create a 54 MHz clock signal and this is supplied to frequency divider 23. In frequency divider 23, the 54 MHz clock signal is divided by 3 so as to create a 18 MHz clock signal and this is supplied to FP counter 24 and VSP control signal generator circuit 25. In FP counter 24, a frame pulse is generated based on the counts of the 18 MHz clock signal, and is supplied to VSP control signal generator circuit 25, phase comparator 29 and external input control circuit 28. In phase comparator 29, the frame pulse from FP counter 24 and the reference frame pulse input via multiplexer 32 from external input control circuit 28 are compared. The result is supplied to 13.5 MHz clock generator circuit 21 so as to perform control the signals into phase. In VSP control signal generator circuit 25, the 18 MHz clock signal from frequency divider 23 and a VSP control signal generated based on the frame pulse from FP counter 24 are supplied along with the 18 MHz clock signal to VSP block 2. In external input control circuit 28, a page control signal for shuffling memory 6 and a masking signal are generated and supplied to VSP block 2.

In DRPPLL circuit 26, the 13.5 MHz clock signal from 13.5 MHz clock generator circuit 21 is multiplied by 31/10 to form a 41.85 MHz clock signal, which is supplied to DRP control signal generator circuit 27. In DRP control signal generator circuit 27, based on the 41.85 MHz clock signal, a DRP control signal is generated, which is supplied together with the 41.85 MHz clock signal to DRP block 3.

Next, in I/O block 1, the input composite signal is sampled and digitized by input video signal processing circuit 5 and further shaped into luminance data Y and chrominance data C. These signals are then written into shuffling memory 6 based on the 13.5 MHz clock signal supplied from control block 4 in accordance with the page management from external input control circuit 28.

In VSP block 2, based on the 18 MHz clock signal supplied from control block 4, the video data is read out from shuffling memory 6 in accordance with the page management from external input control circuit 28. The readout data is masked in data masking circuit 30 in accordance with the masking signal from external input control circuit 28. Then the data is data compressed through orthogonal transformation circuit 7 and shaped into video data of one picture frame by framing circuit 8, which is written into PTG memory 9 and added with the parity.

In DRP block 3, the video data is read out from PTG memory 9 based on the 41.85 MHz clock signal supplied from control block 4 and subjected to predetermined coding processes by encoder 10 and output to the recording head (not shown).

Next, the playback operation of this recording and reproducing apparatus will be described.

First, in control block 4 the 13.5 MHz clock signal generated from 13.5 MHz clock generator circuit 21 is multiplied by 31/10 in DRPLL circuit 26 to form a 41.85 MHz clock signal, which is supplied to DRP control signal generator circuit 27. In DRP control signal generator circuit 27, based on the 41.85 MHz clock signal, a DRP control signal is generated and supplied together with the 41.85 MHz clock signal to DRP block 3. In DRP control signal generator circuit 27, the capstan speed is controlled based on the pilot signal supplied from the reproducing head (not show) via decoder 11 and recorded on the tape. That is, this allows the playback head to trace the recording track exactly, hence, it is possible to reproduce the video data correctly.

The 13.5 MHz clock signal generated from 13.5 MHz clock generator circuit 21 is supplied to 4/1PLL circuit 22, where the signal is multiplied by 4 so that a 54 MHz clock signal is generated and supplied to frequency divider 23. In frequency divider 23, the 54 MHz clock is divided by 3 to generate a 18 MHz clock signal, which is supplied to FP counter 24 and VSP control signal generator circuit 25. In FP counter 24, a frame pulse, based on the counts of the 18 MHz clock signal, is generated and supplied to VSP control signal generator circuit 25. In VSP control signal generator circuit 25, the 18 MHz clock signal from frequency divider 23 and the VSP control signal generated based on the frame pulse from FP counter 24 are supplied together with the 18 MHz clock signal to VSP block 2.

In frequency divider 23, the 54 MHz clock signal is divided by 4 into a 13.5 MHz clock signal, which is supplied via multiplexer 19 to the I/O control signal generator circuit. In the I/O control signal generator circuit, I/O control signal is formed and supplied together with 13.5 MHz clock signal to I/O block 1.

In DRP block 3, the video data reproduced by the playback head (not shown) is supplied to decoder 11, where the data is subjected to the predetermined decoding process, and the decoded data is written into ECC memory 12 based on the 41.85 MHz clock signal from control block 4 whilst being error-corrected.

In VSP block 2, the video data is read out from ECC memory 12 based on the 18 MHz clock signal supplied from control block 4, and is supplied via deframing circuit 13 to inverse orthogonal transformation circuit 14, where the data is subjected to the inverse orthogonal transformation based on the VSP control signal, and is written based on the 18 MHz clock signal into shuffling memory 6 so that one frame of video data will be formed.

In I/O block 1, the video data is read out from shuffling memory 6 based on the 13.5 MHz clock signal supplied from control block 4 and is transformed into the composite data through output video signal processing circuit 15 based on I/O control signal whilst being converted into analog form and is output outside.

Next, description will be made on the case where monitor output of the video data received in the data communications using a 1394I/F is performed in this recording and reproducing apparatus, in accordance with the standard frequency composite signal which is input externally.

First, in phase comparator 29, the 1394I/F transmission side frame pulse supplied via 1394I/F processing circuit 31 is supplied through multiplexer 32 and is compared with the frame pulse from FP counter 24. The result is supplied to 13.5 MHz clock signal generator circuit 21 so as to perform control the signals into phase.

Further, the synchronizing signal is extracted from composite signal input from the Video-In by synchronization separator circuit 16 and is supplied to vertical and horizontal synchronization separator circuit 17. In vertical and horizontal synchronization separator circuit 17, the synchronizing signal is separated into the vertical synchronizing signal and horizontal synchronizing signal. I/OPLL circuit 18, using the horizontal synchronizing signal as a reference signal, forms the 13.5 MHz clock signal, which is recommended by the International Telecommunication Union (ITU-R). This signal is supplied to I/O control signal generator circuit 20 via multiplexer 19. In I/O control signal generator circuit 20, an I/O control signal is formed and supplied along with the 13.5 MHz clock signal to I/O block 1.

In VSP block 2, the input 1394I/F received data is processed through 1394I/F processing circuit 31 based on the 18 MHz clock signal supplied from control block 4 and then the data is temporarily written into ECC memory 12. Thereafter, the video data is read out in accordance with the VSP control signal. The data passes through deframing circuit 13 and then is subjected to the inverse orthogonal transformation by inverse orthogonal transformation circuit 14. Then the data is written based on the 18 MHz clock signal into shuffling memory 6 in accordance with the page management by external input control circuit 28 so that video data of one picture frame will be formed.

In I/O block 1, based on the vertical synchronizing signal supplied from vertical and horizontal synchronization separator circuit 17, the video data is readout, in synchronism with the 13.5 MHz clock signal supplied from control block 4, from shuffling memory 6 in accordance with the page management from external input control circuit 28, the data is shaped by output video signal processing circuit 15 into the composite data based on the I/O control signal whilst being converted into analog form and output outside.

In this operation, since writing to, based on the 18 MHz clock signal, and reading from, based on the 13 MHz clock signal, the shuffling memory are asynchronous, there occur double readings of the same frame and/or frame drops because of the difference between the period of writing and the period of reading as stated above. However, in the case where the 1394I/F received data is recorded onto the tape whilst being monitor displayed, even though double readings of the same frame and/or frame drops occur on the monitor output side, correct data free from double readings of the same frame and frame drops can be recorded on the tape since the 41.85 MHz clock signal supplied to DRP block 3 is locked with the 13.5 MHz clock signal from 13.5 MHz clock generator circuit 21, which is based on the 18 MHz clock signal for preparing the frame pulse, hence will never become out of phase.

In FIG. 1, the 13.5 MHz clock signal, being locked with the horizontal synchronizing signal from the external input composite signal of the standard frequency, is used as an example as the reference clock for reading the data from shuffling memory 6. However, other than this, use of a crystal oscillator of 13.5 MHz, generation of 13.5 MHz clock signal based on the burst lock of the external input composite signal and other methods also make it possible to provide a 13.5 MHz clock signal enough precise and stable to achieve stable monitor video output.

Next, with reference to FIGS. 5 and 6, external input control circuit 28 will be described.

Figure 5:
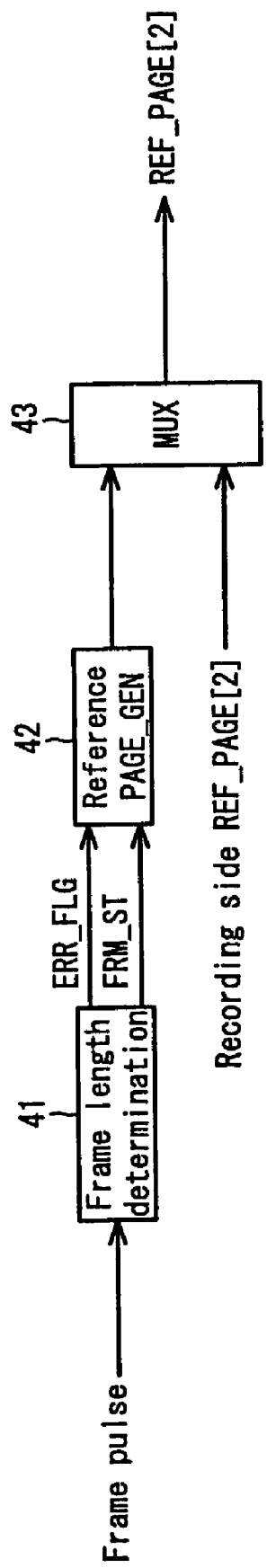
FIG. 5 is a block diagram showing the detailed configuration of an external input control circuit 28.

FIG. 5 is a block diagram showing the detailed configuration of external input control circuit 28.

In this figure, 41 designates a frame length determination circuit, 42 a reference page generator circuit and 43 a multiplexer.

Figure 6:
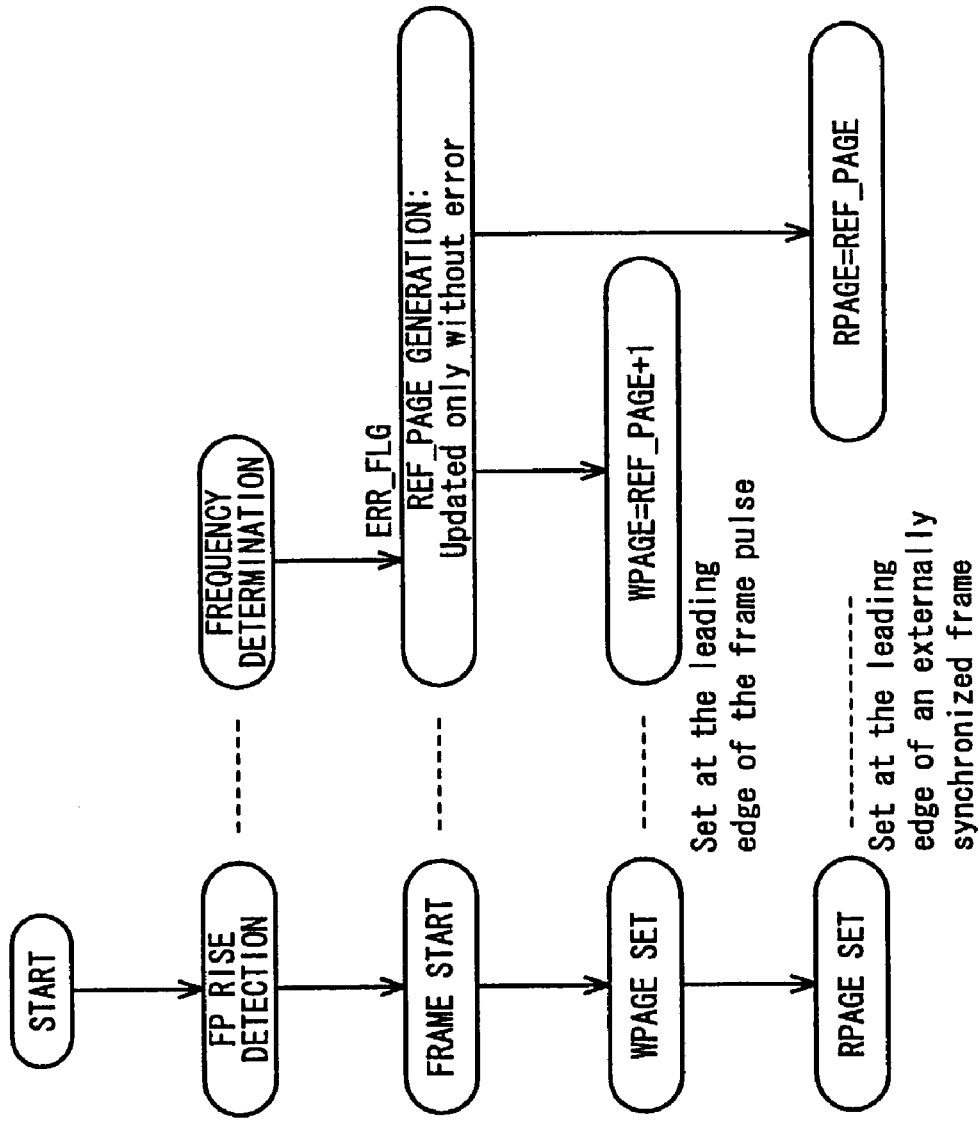
FIG. 6 is a chart showing the processing procedures in an external input control circuit 28.

FIG. 6 is a chart showing the processing procedures in external input control circuit 28.

When the frame length of the frame pulse fluctuates due to noises etc., and due to fluctuations of synchronism in the circuits, page management of shuffling memory 6 is performed as follows. It should be noted that jitter of the frame pulse at the time of signal reception and the like in the 1394I/F communication does not cause frame length variations since the clock speed can be kept constant by PLL circuit.

Frame length determination circuit 41 detects the start of a frame referring to the leading edge of the incoming frame pulse and determines the previous frame length. If the frame length is longer than the predetermined length, or if it is shorter than the predetermined length, an error flag is set. Based on this error flag, reference page generator circuit 42 performs page management of shuffling memory 6. First, at the time a frame starts, the page is defined. Then, only when the previous determination of the frame length does not result in error, the reference page is updated. If the determination results in error, no reference page will be updated and the current reference page is kept. This reference page is controlled to be output by multiplexer 43 switching it from the reference page on the recording side. Based on this reference page, the writing page is set at the leading end of the frame pulse by adding one to the reference page while the value of the reference page as is set for the readout page at the leading end of the external input synchronization.

In this way, the reference page is updated in synchronization with the frame pulse, and writing is performed in synchronization with the 18 MHz clock signal which is locked with the frame pulse whereas readout is performed in synchronization with the 13.5 MHz clock signal which is asynchronous with the 18 MHz signal. Therefore, even if the frequency of the frame pulse varies, it is possible to provide monitor output of the video data free from fluctuations based on the stable 13.5 MHz clock signal.

When a frame length anomaly has occurred, the writing/readout page will be kept until the frame length reverts itself to the normal or until one frame of video data becomes able to be normally written into shuffling memory 6. Therefore, it is possible to output normal video data only.

Next, the second embodiment of the present invention will be described with reference to FIG. 7.

Figure 7:
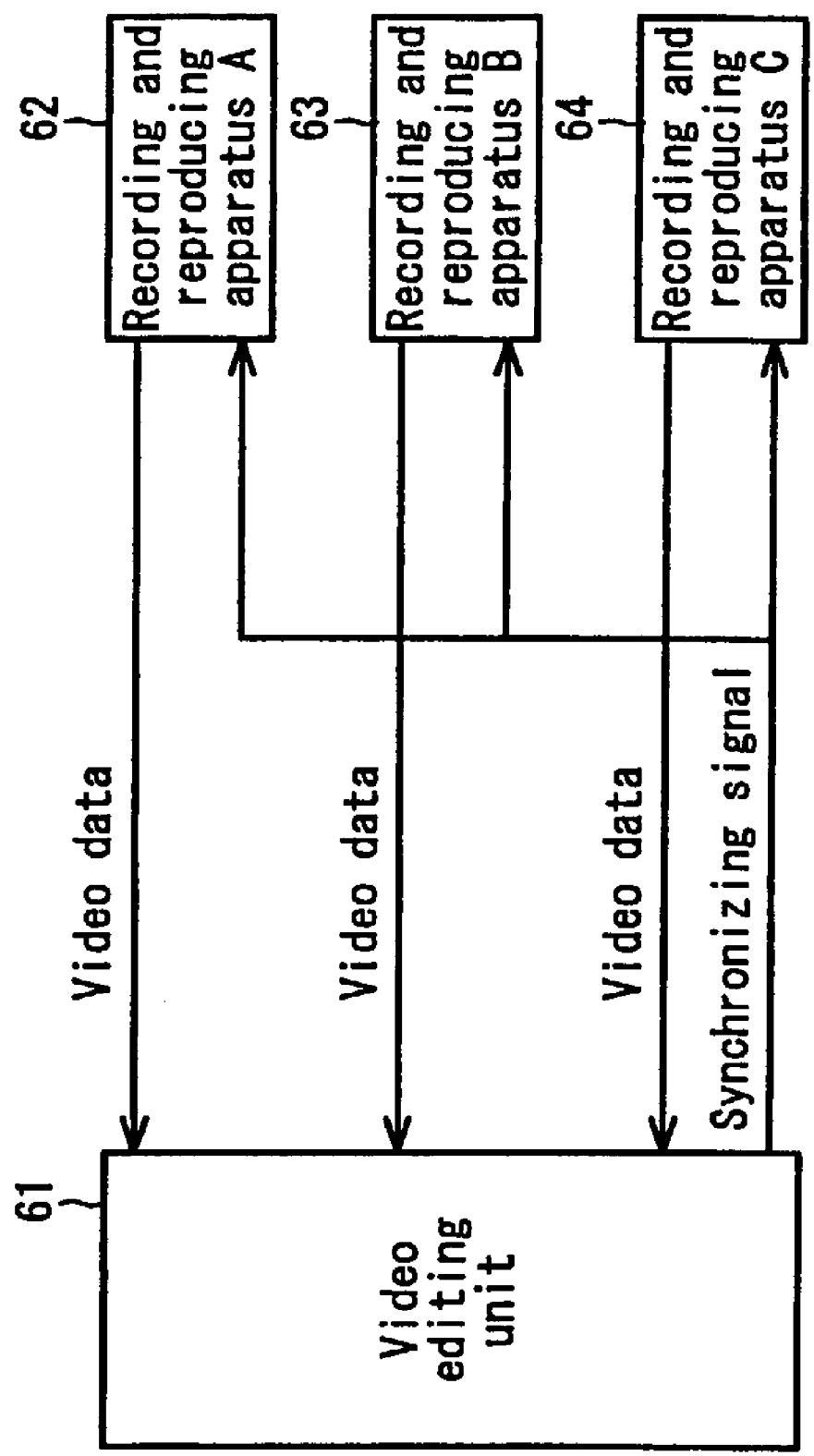
FIG. 7 is a block diagram showing the configuration of a video editing system in accordance with second embodiment of the present invention.

FIG. 7 is a block diagram showing the configuration of a video editing system involving a multiple number of recording and reproducing apparatus according to the first embodiment for reading out video signals from the recording and reproducing apparatus to edit video data.

In this figure, 61 designates a video editing unit, 62, 63 and 64 designate, respectively, a recording and reproducing apparatus A, recording and reproducing apparatus B and recording and reproducing apparatus C in accordance with the this embodiment.

First, a composite signal of the standard frequency is output as a synchronizing signal from video editing unit 61 and is supplied to recording and reproducing apparatuses A62, B63 and C64. When the playback operation is performed in each of recording and reproducing apparatuses A62, B63 and C64, the reproduced video data in synchronism with the vertical and horizontal synchronizing signal of the composite signal input from video editing unit 61 is output as a composite signal from each apparatus and supplied to video editing unit 61. Since the playback video data outputs from the recording and reproducing apparatuses A62, B63 and C64 are synchronized, it is possible to relatively easily effect a variety of video editing tasks. For example, when the video data from recording and reproducing apparatus A62 and that from recording and reproducing apparatus B63 need to be connected, the video data can be switched by frame units, thus enabling smooth connection. Further, when, for example, composition of the video data from recording and reproducing apparatus B63 and that from recording and reproducing apparatus C64 is carried out, it is possible to smoothly effect the composite task of the video data since no synchronism adjustment is needed.

Though the above description of the present video editing system was made on a case where three recording and reproducing apparatuses are used, the system can be applied to a configuration including at least two.

As described above, in accordance with the invention of the present embodiment, even if the frequency of the frame pulse fluctuates during playback, it is possible to produce a monitor output free from disturbance in accordance with the externally input, stable synchronizing signal and clock signal.

Further, use of the shuffling memory for three frames makes it possible to avoid mixture of data within one frame, and management of the frame pages makes it possible to output a normal video data even if the frame length of the frame pulse fluctuates.

Also in receiving and recording a compressed stream through a 1394I/F, use of the synchronizing signal synchronized with the received data and the reference clock signal on the recording side makes it possible to perform normal recording regardless of the monitor output even when the frequency of the received frame pulse is disturbed.

Further, use of at least two sets of recording and reproducing apparatus according to the present embodiment and use of the same synchronizing signal input to each enables output of the playback video data from each apparatus in synchronism with that of the others.

INDUSTRIAL APPLICABILITY

According to the first through the fourth means of the present invention, since a stable readout reference clock signal is used to read out video data from the shuffling memory, it is possible to reproduce the monitor output picture even if jitter arises in the internal frame pulse, and furthermore, since a shuffling memory for three frames is used, it is possible to perform reproduction of data without any mixture of data in each frame. Further, even if the frame pulse fluctuates, management of the frame pages in the shuffling memory for three frames by detecting fluctuations of the frame pulse makes it possible to output normal video data, providing improved quality of image when the data is reproduced.

According to the fifth and the sixth means of the present invention, since in receiving and recording of a compressed stream, recording is performed in synchronism with the clock signal based on the received frame pulse and a reference clock signal which is locked with the received frame pulse, it is possible to perform normal recording and improve the quality of the monitor output video picture even if jitter arises in the received frame pulse.

According to the seventh and the eighth means of the present invention, since the video data can be output in synchronism with the input synchronizing signal from without, it is possible to use a multiple number of the recording and reproducing apparatus and impact the same synchronizing signal.

According to the ninth and the tenth means of the present invention, since the video data can be output in synchronization with the input synchronizing signal from without, use of a multiple number of the recording and reproducing apparatus and imparting the same synchronizing signal make it possible to synchronize the output video data of each with that of the others and hence provide ease of performing video editing tasks.

The invention claimed is:

1. A recording and reproducing apparatus for recording and reproducing video data, comprising:
  a memory;
  a writing means for writing video data into the memory in accordance with a synchronizing signal and a write reference clock signal in synchronization with the video data; and
  a reading means for reading out the video data from the memory in accordance with a synchronizing signal and a stabilized read reference clock asynchronous with a write clock, wherein the memory at least has a capacity of three frames of video data and is provided with a page management means for managing frame pages of the memory, and the reading means reads the video data, which has been written in accordance with the page management means by the writing means, in accordance with instructions for double reading of the same frame and frame dropping from the page management means.

2. The recording and reproducing apparatus according to claim 1, wherein the page management means included: a detecting means for detecting whether a frame length of a frame pulse of video data falls within a designated range; and a retaining means for performing control so that the writing to the memory and a readout page are retained when the detecting means detects that the frame length falls out of the predetermined range.

3. The recording and reproducing apparatus according to claim 1, wherein the memory is used in common for recording and reproducing.

4. The recording and reproducing apparatus according to claim 2, wherein the memory is used in common for recording and reproduction.

5. The recording and reproducing apparatus according to claim 1, further comprising a means for recording a compressed stream received by way of an interface (I/F) as being recorded by a clock signal obtained based on the reference clock signal in synchronism with received data.

6. The recording and reproducing apparatus according to claim 2, further comprising a means for recording a compressed stream received by way of an interface (I/F) as being recorded by a clock signal obtained based on the reference clock signal in synchronism with the received data.

7. The recording and reproducing apparatus according to claim 1, wherein at least one of the readout reference clock signal and the synchronizing signal used by the reading means is supplied from the outside of the recording and reproducing apparatus.

8. The recording and reproducing apparatus according to claim 2, wherein at least one of the readout reference clock signal and the synchronizing signal used by the reading means is supplied from the outside of the recording and reproducing apparatus.

9. A video editing system including a multiple number of recording and reproducing apparatus according to claim 1 and a video editing unit for editing the video data read out from the memories of the multiple recording and reproducing apparatus, characterized in that a same reference clock signal and synchronizing signal are used in common on the side of reading video data from the memories so as to synchronize an output video picture from each recording and reproducing apparatus with that from the others.

10. A video editing system including a multiple number of recording and reproducing apparatus according to claim 2 and a video editing unit for editing the video data read out from the memories of the multiple recording and reproducing apparatus, characterized in that a same reference clock signal and synchronizing signal are used in common on the side of reading video data from the memories so as to synchronize an output video picture from each recording and reproducing apparatus with that from the others.

* * * * *